US006925689B2

(12) United States Patent
Folkmar

(10) Patent No.: US 6,925,689 B2
(45) Date of Patent: Aug. 9, 2005

(54) SPRING CLIP

(76) Inventor: Jan Folkmar, PO Box 263, Weggis (CH)

( * ) Notice: Subject to any disclaimer, the term of this patent is extended or adjusted under 35 U.S.C. 154(b) by 0 days.

(21) Appl. No.: 10/619,320

(22) Filed: Jul. 15, 2003

(65) Prior Publication Data

US 2005/0011053 A1   Jan. 20, 2005

(51) Int. Cl.$^7$ .................... A44B 21/00; B65D 67/02
(52) U.S. Cl. ................. 24/499; 24/511; 24/327; 24/30.5 R
(58) Field of Search .................... 24/30.5 R, 499, 24/500, 511, 67.7, 327, 535, 545, 495, 497, 24/DIG. 27

(56) References Cited

U.S. PATENT DOCUMENTS

| 104,654 | A | * | 6/1870 | Searles | 24/511 |
| 541,384 | A | * | 6/1895 | Pascoe | 24/499 |
| 2,931,086 | A | * | 4/1960 | Rose | 24/545 |
| 3,629,912 | A | * | 12/1971 | Klopp | 24/543 |
| 4,277,864 | A | * | 7/1981 | Orson, Sr. | 24/327 |
| 5,165,147 | A | * | 11/1992 | Kuo | 24/511 |
| 5,179,768 | A | * | 1/1993 | Jio | 24/545 |
| 5,457,858 | A | * | 10/1995 | Lin | 24/511 |
| 6,397,439 | B1 | * | 6/2002 | Langford | 24/499 |

* cited by examiner

Primary Examiner—Robert J. Sandy

(57) ABSTRACT

A clip comprising a pair of jaws connected by a fulcrum for pivotal movement between opposed positions and an arched spring associated with each jaw for biasing the jaws to one position. Each jaw may be molded unitarily with its associated spring and a part of the fulcrum, the fulcrum parts snap fitting together. The arched springs are mounted in back to back relation, and are suitably connected to the jaws by a living hinge. Actuation of the jaws deflects the springs, causing a rolling contact therebetween, with little frictional loss.

20 Claims, 1 Drawing Sheet

SPRING CLIP

FIELD OF INVENTION

This invention relates to simple clip devices. It is particularly described in relation to a bag clip, but it is not limited thereto.

BACKGROUND OF THE INVENTION

Spring clips for closing bags, which are sometimes referred to in commerce as "chip clips" in view of their widespread use for closing bags of potato crisps and the like, are exemplified in U.S. Pat. No. 5,802,677 Dorman et al. Such clips comprise a pair of jaws enlarged at one end to provide a bag engaging portion, and having at the opposed end an actuating portion, and a fulcrum intermediate the ends. A steel spring serves to retain the two jaws together in working relationship, and bias the bag engaging portions together.

It would be desirable to form such a clip entirely from thermoplastic material, so as to avoid rusting to which the steel spring is susceptible, particularly where this can be accompanied by economies in manufacture. Moreover, spring clips (which term is intended to include both clamping and dilating devices unless the context clearly is intended to refer to one or other types of clip) that are devoid of any metal component may be preferable for medical and other uses.

Spring clips utilizing plastic springs are described in the prior art. In U.S. Pat. No. 4,840,341 (HASEGAWA) there is disclosed a plastic clip comprising a pair of jaws and a fulcrum assembly comprising an elongated socket into which an elongated knuckle is snap-fitted, and a tongue which projects from one of the jaws to engage a shallow arcuate groove in the opposing jaw. As the clip is actuated by manual pressure to open the work engaging portions of the clip, the tongue is progressively deflected by the groove. This action increases the area of contact between the tongue and the groove, while simultaneously increasing the contact pressure therebetween. This type of spring is relatively inefficient.

In U.S. Pat. No. 5,361,463 (REVIS) and also related U.S. Pat. No. 5,452,500, there is describe a plastics spring clip which is unitarily molded, and which utilizes a folded plastic strip to bias the jaws of the clip closed, thereby avoiding the frictional engagement of the parts. However, the materials usage for the manufacture of this clip is relatively high, and maybe prohibitively expensive for a simple clip. Also, a single plastic leaf spring with a U-profile will exert a relatively weak biasing force.

In the above snap-together fulcrum assemblies, there remains a possibility of the assembly peeling apart. It would be desirable to provide in plastic spring clips utilizing a snap together fulcrum assembly a means for positively locking the assembly so as to preclude its coming apart.

It is an object of this invention to provide spring clips and the like which may be molded from a plastic material and which may have excellent spring characteristics.

It is another object of this invention to provide spring clips and the like that are economic in materials usage and that are easily assembled.

It is yet another object of this invention to provide in plastic snap-together clip a fulcrum assembly that may readily be locked so as not to be subject to unintentional dis-assembly.

SUMMARY OF THE INVENTION

In accordance with the broad aspect of this invention, in a spring clip such as a chip clip comprising a pair of jaws with an object gripping end and actuating portion and fulcrum connecting the jaws for pivotal movement between a first position and second position, this spring comprises a pair of similar, arched leafs each of which has a proximal end and distal end. The proximal end of each leaf is anchored to a respective one of the jaws with the leaves in a symmetrical back-to-back relationship. The application of a manual force to the actuating portion of the jaws will cause the jaws to move toward the second position, and concomitantly, will act to flatten the spring leaves. This will cause a rolling contact of the one leaf on the other while minimizing frictional contact therebetween.

The strength of the biasing action is easily controlled in manufacture, for example by the suitable selection of materials and the dimensions thereof.

Suitably, the proximal end of each spring leaf is anchored by a means of a hinge, preferably in the form of a living hinge whereby the leaf spring may be molded unitarily with its associated jaw. Also suitably, the distal end of each leaf spring will bear upon the associated jaw; as the spring flattens, the distal end will move relative to the anchor point. Where the clip is relatively small and lightly structured, the distal end will suitably be in sliding contact with the jaw, but for heavier structures the distal end may be made to bear upon the jaw through a generally non-frictional arrangement such as a swivel link or roller.

Suitably, the fulcrum arrangement will comprise a plurality of tabs upstanding from each jaw. At least one tab will be provided with a gudgeon and another with a gudgeon opening into which the gudgeon is snap receivable. This readily permits the jaws to be identical, which may be desirable where it is required to produce relatively few of any specific device. In accordance with the preferred embodiment, the fulcrum comprises two pairs of tabs disposed on each jaw, with one pair carrying gudgeons and the other pair having gudgeon openings therein. Suitably, the jaws may have a central opening therethrough, and two tabs on each jaw may be disposed so as to define in part this opening. This facilitates the molding of the jaws; in addition, it permits a plug to be inserted into the opening following the assembly of the jaws together, so as to prevent the disengagement of the gudgeons from the gudgeon openings on those tabs contiguous with the plug.

Depending on the nature of the fulcrum and its position relative to the actuating and work engaging portions of the jaws, the devices in accordance with the invention may be embodied in many different forms including clamping devices such clips of different types, or in dilating devices for holding things apart.

Having described the broad aspects of the invention, it will be further described in relation to a preferred embodiment thereof, from which still other aims, objects and advantages may become apparent.

DESCRIPTION OF THE PREFERRED EMBODIMENT

Figure 1:
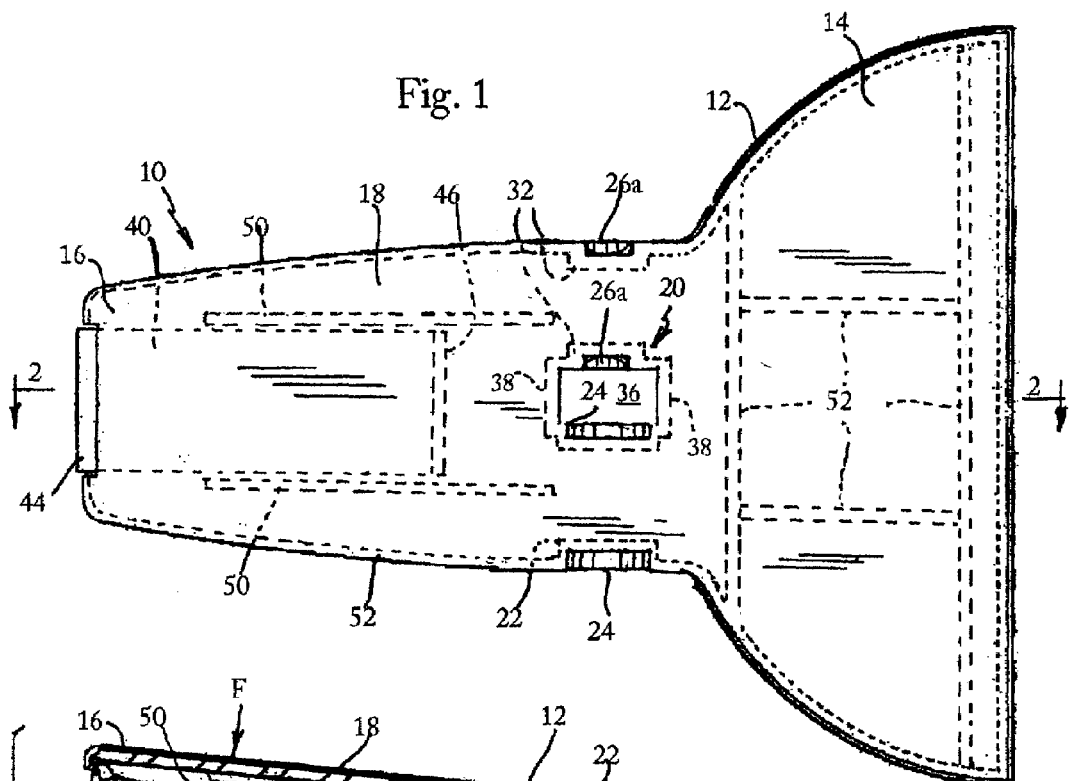
FIG. 1 is a plan view of a spring clip in accordance with the invention, with hidden structure shown in dashed outline.
Figure 2:
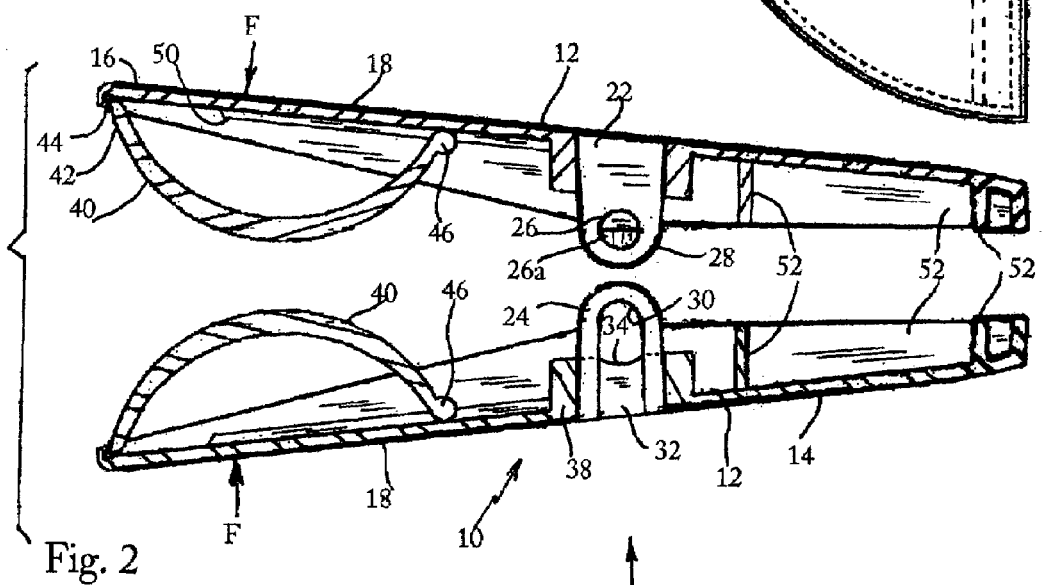
FIG. 2 is an exploded cross-sectional view on the line 2—2 of FIG. 1, in the direction of the arrows.

Referring to the drawings in detail, a spring clip in accordance with the invention is identified generally therein by the numeral 10. Clip 10 comprises two jaws 12 which are conveniently made to be identical. Each jaw 12 has a first end 14 that is suitably shaped in accordance with the desired function of the clip, in this instance the end 14 being transversely enlarged for gripping onto and holding bags shut, and a second end 16 opposed thereto, with a major surface 18 extending therebetween. Intermediate ends 14, 16 there is disposed a fulcrum arrangement 20, subsequently referred to simply as fulcrum 20. Fulcrum 20 comprises two pairs of tabs, 22, 24 that depend from the major surface 18 of each jaw 12. Tabs 22 each carry thereon a transversely outwardly facing gudgeon 26, the lower part 26a of which, as oriented in FIG. 2, is downwardly inwardly chamfered. The distal end 28 of tabs 22 is semicircular, concentric with gudgeons 26. Tabs 24 are provided a slotted gudgeon opening 30, the distal end of which is radiused similarly to gudgeon 26. At the proximal end of tabs 24 and contiguous therewith there is provided a small wall 32 having a side 34 generally opposed to the distal end of gudgeon opening 30, and which is radiused concentrically with that end to form a bearing wall. The outside lateral spacing between tabs 22 is equal to the inside lateral space between tabs 24. Tabs 22, 24 are arranged such that when jaws 12 are opposed, as seen in FIG. 2, tab pairs 22 of each jaw will slide between tab pairs 24, thereby causing gudgeon portions 26a to initially deflect tabs 24 and then permit the gudgeons to engage in the gudgeon openings 30, at which time the radiused tab end 28 will engage bearing surfaces 32, to permit the requisite hinge movement of jaws 12 between an open position, wherein ends 14 are spaced apart, and a closed position wherein these ends are in proximity.

Figure 2A:
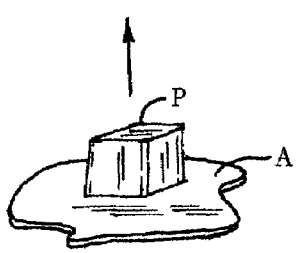
FIG. 2a shows in cross section a portion of an ancillary part that may be united with the clip.

Jaws 12 are provided with a central opening 36 therein that is suitably associated with fulcrum 20. Opening 36 is surrounded by and defined in part by one each of tabs 22 and 24, and in part by stiffening walls 38 that extend therebetween. Opening 36 serves to facilitate the molding of jaws 12 and their associated tabs 22, 24 where these are disposed in central, non-peripheral positions on the jaws, as will be appreciated by persons skilled in the molding arts. Openings 36 further serve to facilitate the mounting onto jaws 12 of ancillary objects or devices, for example a plaque carrying a logo, or a bag slitter, a portion A thereof being illustrated schematically in FIG. 2a. Such devices may be mounted by means of a post P projecting therefrom that is received in an opening 36. Where clips 10 are intended for use in critical applications, a post of this nature will serve to lock gudgeons 26 into their respective gudgeon slots 30 on each lateral side of opening 36, so as to preclude the accidental disengagement of these parts.

Each jaw 12 is provided with an arched spring 40 having a proximal end 42 anchored to end portion 18 of the jaw by a living hinge 44 so as to be freely moveable thereabout. As molded, leaf springs 40 will conveniently extend outwardly from jaws 12, and prior to fulcrum 20 being snap-assembled, the leaf springs will be oriented more of less in the position illustrated in FIG. 2. As fulcrum 20 is snap assembled to unite the two jaws 12 to form clip 10, so the arched leaf springs 40 will bear one upon the other, causing a flattening of the leaf springs and a concomitant biasing of the jaws 12 of the clip to their first position. It will be understood that while in this embodiment the first ends 14 of jaws 12 are biased shut, they could equally be biased open should this be desired.

The proximal end 46 of leaf springs 40 bear upon the under side of major surface 18, and are provided with a part cylindrical cross-section to facilitate the relative movement between the end of the leaf spring and jaw 12. A small wall 50 is disposed on each lateral side of leaf springs 40 on the inner surface of major surface 18 in parallel, slightly spaced apart relation with the lateral edges of the leaf springs, serving as a track along which the longitudinal movement of the leaf spring will be constrained. Ribs 52 depend from major surface 18 to extend substantially about the periphery thereof and also at first end 14, serving variously to stiffen clip 10 and also to enhance the gripping function of the first end.

Considering the operation of clip 10, a manual force F is applied to second end 18, causing the jaws 12 to pivot about fulcrum 20; this compresses leaf springs 40, and moves the jaws at first end 14 towards their second position. The compression of leaf springs 40 causes them to flatten, and will be accompanied by a rolling contact between the contiguous surfaces of the leaf springs, with no or substantially no frictional contact arising between them. The flattening of leaf springs 40 will cause distal ends 46 thereof to ride along the inner surface of major surface 18. Frictional loss from such contact is minimized by the cylindrical formation of the distal ends 46, and walls 50 ensure the lateral alignment of the distal ends, and reduce the possibility of jaws 12 skewing.

What is claimed is:

1. A manual tool comprising a pair of jaws, each said jaw having an object engaging portion and an actuating portion;
    fulcrum means disposed in spaced apart relation from said object engaging portion and said actuating portion for retaining said jaws in pivoting relationship for movement between a first position and a second position; and
    spring means for biasing said jaws to said first position;
    wherein said spring means comprises an arched leaf spring associated with each said jaw, each said leaf spring having a proximal end and a distal end;
    hinge means anchoring the proximal end of each said leaf spring to an associated jaw with said distal end of each said spring in contact with an associated jaw with said springs in symmetrical, contiguous back to back relationship;
    whereby the application of a manual force to said actuating portion of said jaws to move said jaws to their second position will serve to deflect said leaf springs and cause a rolling contact therebetween.

2. A spring clip as defined in claim 1 wherein each said jaw is provided with a guide track for its associated leaf spring.

3. A tool as defined in claim 2 wherein said leaf springs and said jaws are molded from a thermoplastic material.

4. A tool as defined in claim 2 wherein said leaf springs and associated jaws are unitarily molded from a thermoplastic material.

5. A tool as defined in claim 4 wherein said hinge means comprises a living hinge.

6. A tool as defined in claim 4 wherein said fulcrum means is unitarily formed with said jaws.

7. A tool as defined in claim 6 wherein said fulcrum means comprises a plurality of tabs depending from each said jaw, and wherein said tabs are provided with cooperating, snap together gudgeons and gudgeon openings.

8. A tool as defined in claim 7 wherein said jaws are substantially identical.

9. A tool as defined in claim 7 wherein said object-engaging portion is a clamping element biased closed when said jaws are in their first position.

10. A tool as defined in claim 9 wherein said fulcrum means is disposed between said clamping element and said actuating portion.

11. A thermoplastic spring clip comprising a pair of jaws having opposed ends, each having a functional portion adjacent one end thereof and an actuating portion adjacent the opposed end, and a fulcrum therebetween;

spring means biasing said jaws to a position in which said functional portion of one said jaw is in a first desired relationship relative to that of the other jaw;

wherein said spring means comprises an arched leaf spring anchored to each respective one of said pair of jaws by a hinge in symmetrical back to back, contiguous relationship;

and wherein each one of said pair of jaws is provided with a guide track for its associated leaf spring;

application of a manual pressure on said actuating portions to move said functional portions to a second relationship serving to compress said leaf springs resulting in a rolling contact therebetween.

12. A spring clip as defined in claim 11 wherein each said leaf spring is anchored to an associated jaw by a hinge.

13. A spring clip as defined in claim 12 wherein said hinge is a living hinge.

14. A spring clip as defined in claim 11 wherein each said jaw is unitarily formed with its associated leaf spring.

15. A spring clip as defined in claim 11 wherein said fulcrum comprises a plurality of tabs depending from each said jaw, and wherein said tabs are provided with cooperating, snap together gudgeons and gudgeon openings.

16. A spring clip as defined in claim 15 wherein ones of said tabs serve at least in part to define an aperture in said jaws to permit the entry of a post therein.

17. A manual tool comprising a pair of jaws, each said jaw having an object engaging portion and an actuating portion;

fulcrum means disposed in spaced apart relation from said object engaging portion and said actuating portion for retaining said jaws in pivoting relationship for movement between a first position and a second position; and spring means comprising an arched leaf spring associated with each said jaw, each said leaf spring having a proximal end secured to a said jaw by a hinge and a distal end with said springs in symmetrical, contiguous back to back relationship, the application of a manual force to said actuating portion of said jaws to move said jaws to their second position will acting to deflect said leaf springs and cause a rolling contact therebetween;

wherein each said jaw is unitarily formed together with its associated hinge, leaf spring and also a plurality of tabs provided with cooperating snap together gudgeons and gudgeon openings forming said fulcrum means.

18. A spring clip as defined in claim 17 wherein each said jaw is provided with a guide track for its associated leaf spring.

19. A tool as defined in claim 17 wherein said jaws are substantially identical.

20. A tool as defined in claim 17 wherein said object-engaging portion is a clamping element biased closed when said jaws are in their first position.

\* \* \* \* \*